Mar. 20, 1923.

W. E. PETERSON.
GRADOMETER.
FILED FEB. 3, 1921.

1,449,244.

Inventor
Ward E. Peterson

By

D. V. Mahoney.
Attorney

Patented Mar. 20, 1923.

1,449,244

UNITED STATES PATENT OFFICE.

WARD EPHRAHIM PETERSON, OF OXFORD, NORTH CAROLINA.

GRADOMETER.

Application filed February 3, 1921. Serial No. 442,039.

*To all whom it may concern:*

Be it known that I, WARD EPHRAHIM PETERSON, a citizen of the United States, residing at Oxford, in the county of Granville and State of North Carolina, have invented new and useful Improvements in Gradometers, of which the following is a specification.

This invention relates to a gradometer, and it comprises a substantially rectangular casing having a transparent top, a pendulum pivotally mounted therein, means for adjusting said pendulum, and a scale arranged on the bottom of said casing, and adapted to indicate the inclination of the surface on which the gradometer is arranged.

The use of instruments including a pivotally mounted pendulum for the purpose of determining the inclination of surface has been proposed heretofore, but such prior devices have been open to several objections. The relatively complicated constructions employed have been unnecessarily expensive to manufacture and repair. A further objection is the fact that it has been impossible to use such devices to determine the inclination between two points not on a surface.

In the present invention I have produced a very simple device which may be cheaply manufactured, and in which there are relatively few parts to get out of order. The device consists of a box or casing having a top of glass or other transparent material, and a pendulum arranged therein. The scale is arranged on the bottom of the casing, and lies wholly in a single plane.

In the present invention I provide a scale whereby the angle may be determined in inches per foot or percentage of grade. The first system is universally employed by architects and the latter by engineers, and instruments of this character have heretofore usually been made for the exclusive use of one of the two professions. Knowing the angular degree and length of a given surface, it is still rather difficult to transpose it into inches per foot, and total inclination, and I find it advantageous to provide means for determining the inclinations either in percentage or inches per foot.

In the accompanying drawings, I have shown one embodiment of the invention.

In this showing,

Figure 1:
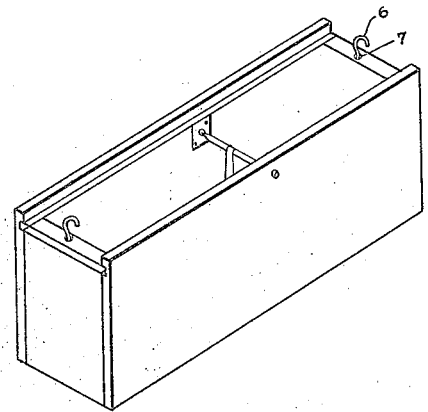
Figure 1 is a perspective view of the device.
Figure 2:
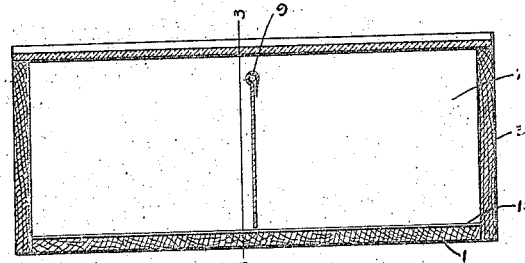
Figure 2 is a central, vertical longitudinal sectional view.
Figure 3:
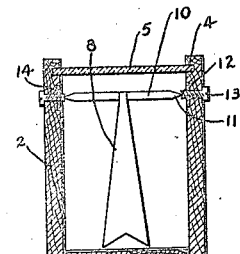
Figure 3 is a transverse sectional view on the line 3—3 of Figure 2.
Figure 4:
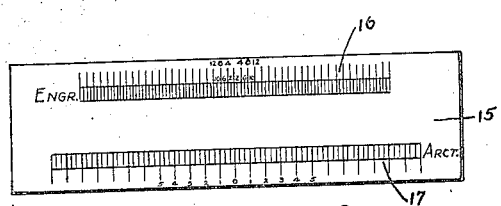
Figure 4 is a detail view of the scale.

Referring to the drawings, the reference numeral 1 represents the bottom of the casing, to which is secured the side walls 2 and end walls 3. The casing may be formed of any suitable material, such as wood, or the like, and is provided with an open top. The side walls extend slightly above the end walls, and these extensions are provided with longitudinal grooves 4. The top 5 is slidably arranged in these grooves. As shown it is made of glass, or other transparent material to permit inspection of the interior of the casing. The top may be retained in any longitudinal arrangement by the hooks 6, passing through openings 7 arranged adjacent to the ends of the top and received in openings in the end walls. These hooks also serve as suspension means whereby the device may be suspended from a cord stretched between two points to obtain the percentage of grade of a line connecting the points, as in grading roadways, building operations and the like.

A pendulum 8 is pivotally mounted within the casing and is adapted to assume a perpendicular position at all times. As shown the upper end of the pedulum is curled as at 9 and adapted to surround a shaft or rod 10, by means of which it is supported. The ends of the rod or shaft are pointed as at 11, and received in recess 12, in the ends of screws 13 passing through the side walls. Plates 14 of metal or similar material may be arranged on the inside of the side walls to form a more substantial bearing for the screw. The construction provides a very efficient mounting for the pendulum, and permits it to be adjusted by loosening or tightening screws 13.

As shown a scale 15 is arranged on the bottom of the casing being secured thereto in any suitable manner, as by means of an adhesive. The scale is provided with two sets of indications 16 and 17, forming an engineer's scale and an architect's scale respectively.

In the use of the device, it is placed on a surface, the inclination of which is to be determined, and the pendulum assuming a perpendicular position indicates the angle of the surface on the scale 15. The provision of the scales 16 and 17 renders it possible to obtain a reading either percentage or inches per foot. The total rise between the two ends of the surface may be readily obtained by multiplying the length by the inches per foot rise in surface.

When the difference in elevation between two points not in a surface are to be determined, as in grading roadways and the like, a cord may be stretched between the given points and the hooks 6 arranged over the cord. The inclination of the line connecting the two points may then be readily determined. It will be noted that the hooks also serve to retain the cover 5 in position, and that the cover may be readily removed by unscrewing the hooks, and sliding it out of the grooves 4.

The construction provides, a very simple instrument that is cheap to manufacture and assemble. The provision of a scale arranged on a flat surface is advantageous because of its simplicity and accessibility when the cover is removed.

What I claim is:

1. A gradometer comprising a substantially rectangular casing having an open top, a transparent cover arranged on the top of said casing, a pendulum pivotally mounted in said casing and a scale secured to the bottom of said casing and co-operating with said pendulum, said scale being arranged to indicate the percentage of grade and in inches per foot.

2. A gradometer comprising a substantially rectangular casing having an open top, the side walls of said casing being provided with grooves adjacent to the top, a transparent cover slidably mounted in said grooves, a pendulum pivotally mounted in said casing, and a scale secured to the bottom of said casing and co-operating with said pendulum, said scale being arranged to indicate the percentage of grade and in inches per foot.

3. A gradometer comprising a substantially rectangular casing having an open top, the side walls of said casing being provided with grooves adjacent to the top, a transparent cover slidably mounted in said grooves, said cover being provided with openings adjacent to its ends, threaded members passing through said openings and entering the end walls of the casing to retain the cover in position, said members being provided with hooks on their upper ends adapted to receive a cord to hold the gradometer in suspended position, a pendulum pivotally mounted in said casing, and a scale secured to the bottom of said casing and co-operating with said pendulum, said scale being arranged to indicate percentage of grade and in inches per foot.

In testimony whereof, I affix my signature.

WARD EPHRAIM PETERSON.